US005124088A

United States Patent [19]

Stumphauzer

[11] Patent Number: 5,124,088

[45] Date of Patent: Jun. 23, 1992

[54] PROCESS AND APPARATUS FOR RAPIDLY CARBONATING WATER

[76] Inventor: William C. Stumphauzer, 44550 Stang Rd., Elyria, Ohio 44035

[21] Appl. No.: 577,293

[22] Filed: Sep. 4, 1990

[51] Int. Cl.[5] .......... B01D 47/02; C10J 1/08

[52] U.S. Cl. .......... 261/121.1; 261/DIG. 7; 222/129.1; 99/323.1

[58] Field of Search .......... 222/129.1-129.4, 222/146.6, 397, 1; 261/DIG. 7, 121.1; 99/323.1-323.3

[56] References Cited

U.S. PATENT DOCUMENTS

| | | | |
|---|---|---|---|
| 2,826,401 | 3/1958 | Peters | 222/129.1 X |
| 3,583,601 | 6/1971 | Ayers | 222/129.1 X |
| 3,731,845 | 5/1973 | Booth | 222/129.1 X |
| 3,752,452 | 8/1973 | Iannelli | 261/DIG. 7 X |
| 3,877,358 | 4/1975 | Karr | 261/DIG. 7 X |
| 4,139,123 | 2/1979 | Castillo | 222/129.1 X |
| 4,179,375 | 12/1979 | Smith | 261/121.1 |
| 4,216,879 | 8/1980 | McMillin | 222/1 |
| 4,355,653 | 10/1982 | Credle, Jr. | 261/DIG. 7 X |
| 4,440,318 | 4/1984 | Berger | 222/129.1 |
| 4,482,509 | 11/1984 | Lannelli | 261/DIG. 7 X |
| 4,493,441 | 1/1985 | Sedam et al. | 222/129.1 |
| 4,518,541 | 5/1985 | Harris | 261/DIG. 7 X |
| 4,632,275 | 12/1986 | Parks | 261/DIG. 7 X |
| 4,660,741 | 4/1987 | Kirschner et al. | 222/129.1 X |
| 4,688,701 | 8/1987 | Sedam | 222/129.1 |
| 4,719,056 | 1/1988 | Scott | 261/DIG. 7 X |
| 4,742,939 | 5/1988 | Golockin | 222/129.1 X |
| 4,745,853 | 5/1988 | Hoover | 261/DIG. 7 X |
| 4,764,315 | 8/1988 | Brusa | 261/DIG. 7 X |
| 4,766,001 | 8/1988 | Mizandjian et al. | 261/DIG. 7 X |
| 4,850,269 | 7/1989 | Hancock et al. | 261/DIG. 7 X |
| 4,923,644 | 5/1990 | Kuckens | 261/DIG. 7 X |
| 4,940,164 | 7/1990 | Hancock et al. | 261/DIG. 7 X |
| 4,950,431 | 8/1990 | Rudick et al. | 261/DIG. 7 X |

FOREIGN PATENT DOCUMENTS 412849 7/1934 United Kingdom .

*Primary Examiner*—Kevin P. Shaver
*Assistant Examiner*—Kenneth DeRosa
*Attorney, Agent, or Firm*—Paul E. Milliken

[57] ABSTRACT

A process and apparatus for rapidly carbonating water for use in applications such as a post-mix beverage dispenser by injecting carbon dioxide under pressure beneath the water in a pressure vessel, causing the water to swirl in a circular turbulent mixing motion while restrictively venting some of the carbon dioxide from the pressure vessel for a sufficient amount of time to carbonate the water, then sealing the pressure vessel to the atmosphere and continuing to inject carbon dioxide under pressure into the pressure vessel to prevent dissolved carbon dioxide from coming out of solution in the water and for dispensing the carbonated water upon demand.

24 Claims, 2 Drawing Sheets

PROCESS AND APPARATUS FOR RAPIDLY CARBONATING WATER

This invention relates to a process and apparatus for rapidly carbonating water which is particularly suitable for a small post-mix beverage dispenser of the type used in homes or small offices.

BACKGROUND OF THE INVENTION

It is known that for a given gas which is soluble or partially soluble in a given liquid, (i.e., carbon dioxide and water) the rate of solvation of the gas into the liquid increases as the interfacial area between a given volume of the liquid and the gas is increased per given unit of time. For example, far more oxygen dissolves per unit of time into water cascading over a turbulent waterfall than dissolves into the equivalent volume of still water in a pond or lake in the same length of time.

Various methods of carbonating water are know in the prior art. In one such method carbon dioxide gas is injected into the water to be carbonated at a low level forming bubbles which float up through the water to the surface so that carbon dioxide in the bubbles becomes absorbed into the water. This method is often used in small carbonating apparatus for home use where only a limited number of drinks are mixed. Examples of this injection method of carbonation can be seen in UK Patent Specification No. 412,849 (Schwendimann) and U.S. Pat. No. 2,826,401 (Peters). The main problem with this injection method is that it is only effective if relatively high pressures are used in the carbonation chamber during carbonation.

A second known method of carbonating water involves spraying or atomizing the water into an atmosphere of carbon dioxide gas. In this method a carbonation chamber may be prefilled with carbon dioxide and the water introduced into the chamber by spraying or the chamber may be partially filled with water and the water drawn upwardly and sprayed into the carbon dioxide atmosphere above the water level in the chamber. In this method, carbon dioxide is dissolved into the water droplets in the spray and the droplets carry the carbon dioxide in dissolved form into the body of water to effect carbonation. Typical examples of this method are shown in U.S. Pat. No. 2,306,714 (Rowell) and U.S. Pat. No. 2,391,003 (Bowman). A major problem with this method is that it requires the carbonation chamber to be pressurized to a relatively high pressure and a long time is required to achieve sufficient carbonation.

A third known method of carbonation, shown in U.S. Pat. No. 4,719,056 (Scott), involves partly filling a carbonation chamber with water and providing an atmosphere of carbon dioxide above the level of water in the chamber and continuously or repeatedly drawing or forcing gas from said atmosphere down into the water by a rotating member such as a paddle wheel which rotates about a horizontal axis at 1,000 to 1,500 RPM and passes through both the carbon dioxide atmosphere and the water. This mechanical mixing increases the area of interface exposure between the carbon dioxide and water; i e., in comparison to no mixing and causes the water and carbon dioxide to form a solution far more rapidly and to a greater solution concentration than would occur if there were no such mixing of the gas and water. The main disadvantages of this method is that it requires more moving parts, has more chance of malfunction and requires more energy to operate.

It is also known that the carbon dioxide gas solubility rate and dissolved gas concentration level in water increases as the pressure acting upon the liquid gas mix increases.

Finally, within limits, as the temperature of water decreases, the amount of carbon dioxide that can be dissolved into a given volume of water increases. This relationship is shown in Table 10-1 entitled "Solubility of Gases in Water" page 10-4 *Langs Handbook of Chemistry* 12th Edition. This table shows the solubility of carbon dioxide in milliliters per gram of water to be 0.759 ml at 30° C. (72° F.) and 1.646 ml at 1° C. (34° F.) showing 216 percent more carbon dioxide may be dissolved into the water at 1° C. than at 30° C.

The ideal process, therefore, for rapidly carbonating water with maximum levels of dissolved carbon dioxide would provide for:

- a means to cause high interfacial contact between the water and carbon dioxide;
- a means to carry out the process at elevated pressure; and
- a means to carry out the process with water temperatures where the carbon dioxide gas solution level is highest; i.e., a water temperature range of 1° to 5° C.

The present invention satisfies these conditions at low cost and without the use of mechanical mixers or motors as will be explained later in the specification.

OBJECTS OF THE INVENTION

It is a primary object of this invention to provide a simple, inexpensive and efficient process and apparatus for rapidly carbonating water for use in applications such as a small beverage dispenser.

Another object of this invention is to provide a process and apparatus for rapidly carbonating water which has a minimum number of moving parts and does not require a pump to circulate or dispense the carbonated water or to pressurize the carbonation tank or a mechanical mixer to increase the interfacial contact between the water and the carbon dioxide.

A still further object of this invention is to provide a process and apparatus for rapidly carbonating water which uses the same carbon dioxide inlet pressure in the carbonation tank both for carbonating the water in the tank and for dispensing the water from the tank.

An even further object of the invention is to provide a process and apparatus for rapidly carbonating water which also rapidly cools the water in the carbonation tank.

These and other objects of the invention will become more fully apparent in the following specification and the attached drawings.

SUMMARY OF THE INVENTION

This invention is a process and apparatus for rapidly carbonating water by providing a pressure vessel, venting the interior of the pressure vessel to the atmosphere, at least partially filling the vessel with water, injecting carbon dioxide at a first pressure and simultaneously restrictively venting the interior of the pressure vessel for a specified period of time to maintain the internal tank head pressure at a specified second pressure which is lower than the first pressure but which is sufficient to cause the carbon dioxide to flow through the water and out of the pressure vessel, sealing the pressure vessel to the atmosphere, and continuing to inject carbon dioxide into the pressure vessel at the first pressure to maintain a pressure within the sealed pressure vessel which is sufficient to dispense carbonated water, upon demand, from a liquid outlet in the wall of the pressure vessel.

DESCRIPTION OF THE PREFERRED EMBODIMENTS

Figure 1:
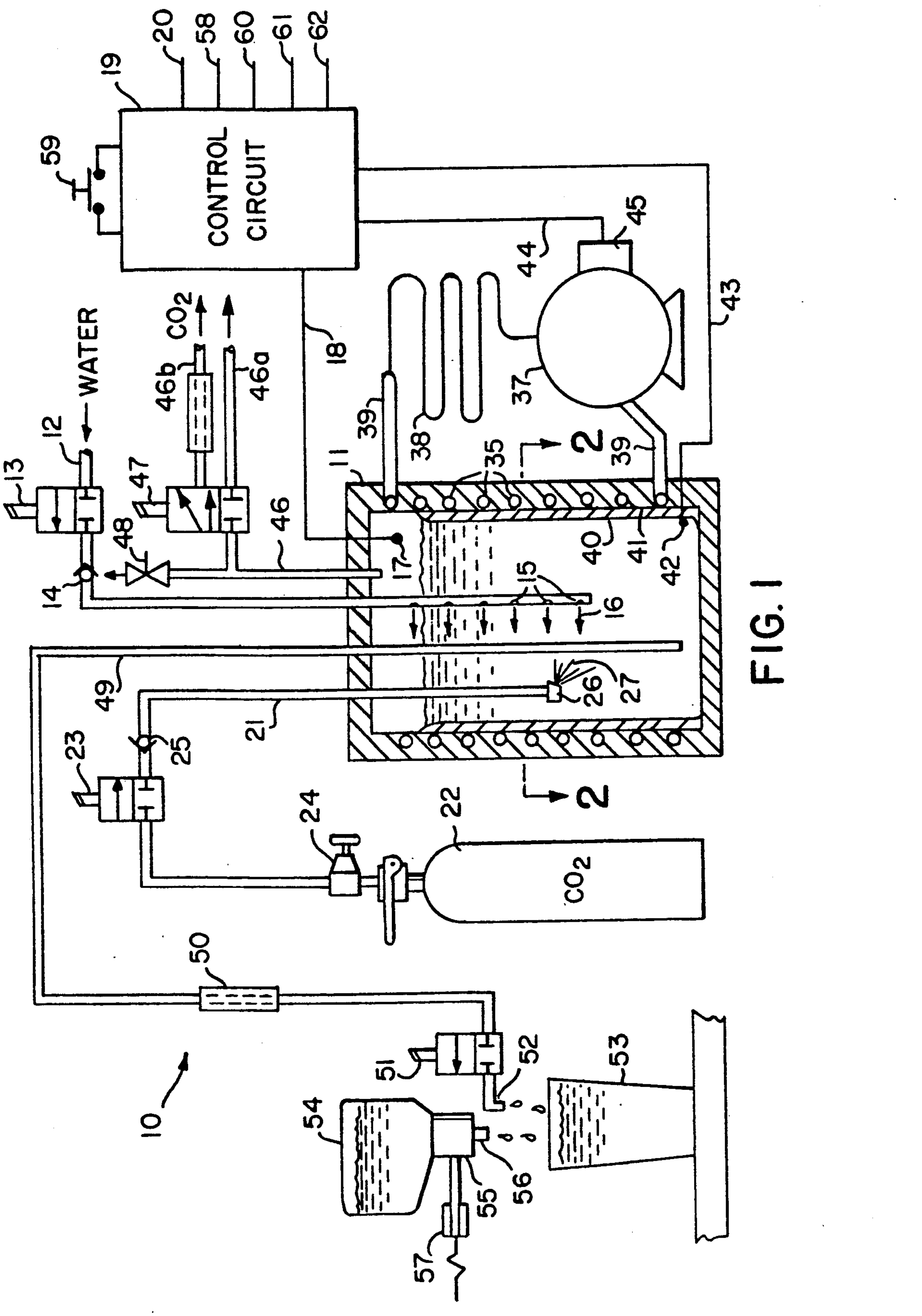
FIG. 1 is a diagrammatic view showing apparatus of the preferred embodiment of the invention.

Referring now to the drawings and in particular to FIG. 1, a carbonation system for carrying out the present invention is generally designated by the numeral 10. An important component of the system is a carbonation tank 11 which is a pressure vessel designed to withstand the amount of pressure to be used in the carbonation process and for dispensing the carbonated liquid.

A water supply tube 12 extends from a water source (not shown) into the interior of the tank 11. A valve 13 located along the tube 12 turns on and off the flow of water to the tank 11 and a check valve 14 is also located along the tube 12 to prevent a backup of water in the tube 12 if the pressure in the tank 11 exceeds the water pressure in the tube 12. In the apparatus shown in FIG. 1 the water supply tube 12 enters the tank 11 through the top thereof and extends vertically downwardly toward the bottom of the tank a sufficient distance that when the tank is substantially filled with water, a portion of the tube 12 is below the water level. This extension of the tube 12 contains a plurality of vertically spaced apart holes 15 which permit horizontal streams of water as shown by the arrows 16 to flow into the tank 11 in a tangential direction thereby causing the water in the tank to swirl in a circular motion within the tank for purposes which will be explained later.

A high water level sensor 17 is located inside the tank 11 at a suitable location near the top thereof to detect when the water reaches the maximum desired level in the tank and send a signal through an electrical line 18 to a control circuit 19 which in turn sends a signal through a line 20 to close the valve 13 and turn off the flow of water into the tank 11.

A carbon dioxide supply tube 21 extends from a pressurized tank 22 of carbon dioxide into the interior of the carbonation tank 11 to provide carbon dioxide when needed for carbonating water therein. The flow of carbon dioxide is turned on and off by a normally open valve 23 located along the tube 21 and the pressure of carbon dioxide flowing from the tube 21 into the tank 11 is controlled by a pressure regulator 24 which may be set to provide a pressure preferably in the range of 60 to 100 psi (4.219 to 7.031 kg/cm$^2$). A check valve 25 is provided in the tube 21 to prevent a back-up of carbon dioxide or water from the tank 11 into the valve 23 or regulator 24. The carbon dioxide supply tube 21 extends through the top of the tank 11 and vertically downwardly into the tank a sufficient distance so that its lower end is below the water level when the tank 11 is filled with water to its usual level for carbonation. An injector spray nozzle 26 is operatively attached to the lower end of the tube 21 to provide a diverging spray 27 of carbon dioxide into the water to effect carbonation of the water. The nozzle 26 is preferably positioned to direct the spray of carbon dioxide in a tangential direction within the tank 11 thereby causing the water to swirl in a circular motion within the tank as shown by the direction of the arrows 28 in FIG. 2. Thus the swirling motion of the water can be generated either by the inlet flow of water or carbon dioxide into the tank or by both.

Figure 3:
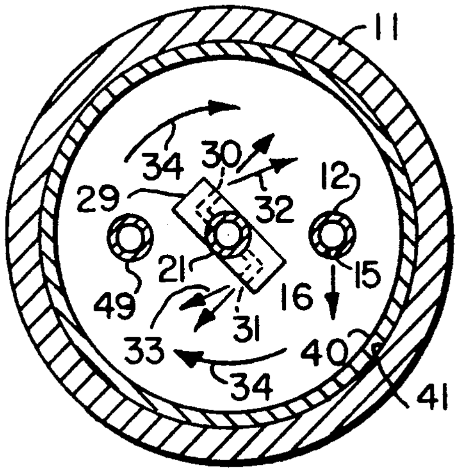
FIG. 3 is a cross-sectional view similar to FIG. 2 but showing a different embodiment of the invention.

As shown in FIG. 3, as an alternative, a double injector nozzle 29 may be mounted on the lower end of the tube 21, in which case, two nozzle outlet orifices 30 and 31 respectively provide opposed sprays 32 and 33 thereby increasing the swirling or churning motion of the water within the tank in the direction of the arrows 34 and further increasing the interfacial contact between the carbon dioxide and the water for more rapid carbonation. When a double nozzle is used it is preferable to locate it in the center of the tank 11 as shown in FIG. 3.

The tank 11 is surrounded by a series of cooling coils 35 having one end connected through a refrigerant tube 36 to a compressor 37, through a condenser 38 and then through a tube 39 to the opposite end of the coils 35. The circulation of a refrigerant such as Freon through the cooling coils 35 causes a layer 40 of ice to build up on the inner surface of the sidewall 41 of the tank 11 and cool the water in the tank as it is swirled around inside the tank by the flow of water and/or carbon dioxide into the tank as previously described An ice sensor 42 is located on the inner surface of the sidewall 41 of the tank 11 and when the ice reaches the desired thickness, preferably in the range of ½ to 1 inch (1.27 to 2.54 cm$^2$), the sensor 38 sends a signal through a line 43 to the control circuit 19 which turns off the flow of current through a line 44 to the motor 45 of the compressor 37, thereby stopping operation of the compressor and the flow of refrigerant and preventing a further increase in the thickness of the layer of ice 40 on the inside surface of the tank sidewall 41.

A vent or exhaust pipe 46 extends through the top of the tank 11 in communication with the interior of the tank. A three way normally closed valve 47 is operatively connected into the vent pipe 46 to provide the alternatives of being fully open through a full vent pipe 46*a* for complete venting of the tank 11, partially open for a restricted venting of the tank 11 through a restricted vent pipe 46*b* at approximately 40 to 80 psi (2.812 to 5.625 kg/cm$^2$) or fully closed to seal the interior of the tank 11 from the atmosphere. Also operatively connected into the vent pipe 46 is a pressure relief valve 48 which opens when the internal pressure within the tank reaches a certain specified pressure, preferably in the range of 100 to 150 psi (7.03 to 10.55 kg/cm$^2$) thereby preventing an unsafe pressure from building up with the tank.

A water carbonated water dispensing tube 49 extends through the top of the tank 11 and into the interior of the tank a sufficient distance so that the intake end of the line is near the bottom of the tank 11 in order to permit withdrawal of substantially all the carbonated water in the tank. The water dispensing tube 49 extends from the tank 11 through a restrictor 50 which limits the amount of pressure drop in the line and thereby prevents dissolved carbon dioxide from coming out of solution in the water when it is dispensed. The outlet end of the dispensing tube 49 is connected to a dispensing valve 51 which turns off and on the flow of carbonated water as needed. When released by the valve 51 the carbonated water then flows through an outlet spout 52 into a drinking receptacle 53 where it may be mixed with flavoring concentrate from a container 54 released through a valve 55 having an outlet 56 and which is operated by a solenoid 57 controlled by the control circuit 19 through a line 58 as will be further explained later, so that the release of both carbonated water and flavoring concentrate can be timed to coincide with each other to produce a carbonated drink upon demand.

The control circuit 19 has a flavor selector/start switch 59 for selecting a beverage flavor and starting the flow of flavor concentrate and carbonated water. In addition to the lines already described connected to the control circuit 19, the circuit 19 also has output lines 60, 61 and 62 which are connected to operate valves 23, 47 and 51 respectively.

In operation the carbonation apparatus 10 shown in FIG. 1 is automatically activated by the control circuit 19 when the water level in the tank 11 falls below a certain desired level. In the present apparatus the level of the water is monitored by a counter (not shown) which counts the number of drinks dispensed from the system and when sufficient water has been withdrawn from the tank 11 to produce a predetermined number of drinks, the control circuit 19 sends a signal through the line 20 to open the valve 13 and permit water from a water supply source (not shown) to flow through the supply tube 12 into the interior of the carbonation tank 11. Simultaneously during this time the control circuit 19 sends a signal through the line 61 to cause the three-way valve 47 to move to the "full vent" position opening into the full vent line 46*a* to permit the water to rapidly enter the tank 11 and the normally open carbon dioxide supply valve 23 is turned off.

While water is flowing into the tank 11 it is directed in streams 16 which are tangential to the sidewall 41 of the tank causing the water to move in a swirling motion around the sidewall where it is chilled by a layer of ice 40 built up on the sidewall of the tank 11 due to the action of the cooling coils 35.

When the water reaches a desired level near the top of the tank 11 the high water sensor 17 sends a signal through line 18 to the control circuit which turns off the valve 13 thereby stopping the flow of water into the tank 11 and simultaneously moving the valve 47 to the "restricted vent" position in which it permits a flow of carbon dioxide out of the tank 11 through the restricted vent pipe 46*b* at a restricted vent pressure of 40 to 80 psi (2.812 to 5.625 kg/cm$^2$). During this time the control circuit 19 also sends a signal through the line 60 to the valve 23 which opens the valve and permits carbon dioxide to flow from the supply tank 22 through the pressure regulator 24, the carbon dioxide inlet tube 21 and the nozzle 26 at a pressure in the range of 60 to 100 psi (4.22 to 7.03 kg/cm$^2$).

Although gas solvation can occur with inlet injector pressure nozzle pressures as low as 20 psi (1.406 kg/cm$^2$), inlet pressure in the range of 60 to 100 psi (4.22 to 7.03 kg/cm$^2$) produces and ideal level of carbonation in less time than would be required at 20 psi (1.406 kg/cm$^2$). Injector nozzle inlet pressures above 100 psi (7.03 kg/cm$^2$) would be even more efficient but there are cost penalties caused by the need for heavier valving, stronger fluid lines, and thicker vessel walls which would make the use of such higher pressures more expensive.

The carbon dioxide is sprayed from the nozzle 26 (or the nozzle outlets 30 and 31 in FIG. 3) beneath the water in a tangential direction with respect to the sidewall of the tank 11 and thereby creates a swirling or turbulent mixing of the carbon dioxide and water. This turbulence causes the desirable condition of high interfacial contact area between the water and the carbon dioxide which results in more rapid and effective solvation of the carbon dioxide in the water.

The degree of turbulent mixing produced depends upon the orientation and number of carbon dioxide spray injector nozzles and the velocity of gas flow from the nozzle. As the differential pressure between the nozzle and head space increases, the velocity of the gas flow and turbulent mixing increases. This pressure differential is influenced by the relative size difference between the sum of the injector nozzle orifices restrictive value and the orifice restrictive value of the restricted vent. The greater difference in orifice restrictor value (a function of orifice diameter and length) between the injector nozzle and restricted vent, the higher the gas flow rate and velocity of gas spray into the water.

Since the inlet pressure of the carbon dioxide sprayed into the water by the nozzle 26 is greater than the restricted vent pressure of the valve 47 the pressure differential causes some of the carbon dioxide entering the tank 11 to pass through the water and be vented through the vent pipe 46, the valve 47 and the restricted vent pipe 46*b*.

Since the carbon dioxide is being sprayed into the water in a tangential direction with respect to the sidewall 41 of the tank 11 and creates a swirling motion of the water within the tank this causes the water to wash against the ice layer 40 on the sidewall 41 of the tank so that the water is rapidly chilled to a temperature of from 1° to 5° C. through a process of direct heat exchange between the water and the ice.

When sufficient time has elapsed to complete carbonation of the water in the tank 11, a period of approximately 0.25 to 0.45 seconds per fluid ounce (8.5 to 15.2 seconds per liter) of water to be carbonated, the control circuit 19 fully closes the valve 47 to seal off the interior of the tank 11 from the atmosphere while the valve 23 is permitted to remain open to provide dispensing pressure to the interior of the tank 11. The dispensing pressure is the same inlet pressure as that provided to the tank during the carbonation of the water, i.e. 60 to 100 psi (4.22 to 7.03 kg/cm$^2$).

When it is desired to dispense carbonated water from the tank for a beverage, the flavor selector/start button 59 on the control circuit 19 is pressed and the control circuit sends a signal through the line 62 to open the valve 51 long enough to provide the desired amount of carbonated water through the spout 52. Simultaneously the control circuit 19 sends a signal through the line 58 to cause the solenoid 57 to operate the valve 55 to open and release a required amount of flavor concentrate to flow from the spout 56 into the drinking receptacle 53 where it mixes with the carbonated water from the spout 52.

Figure 2:
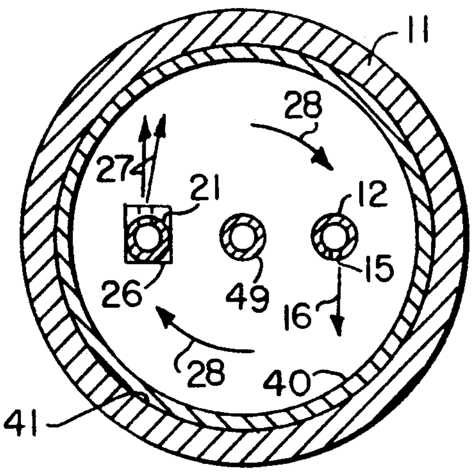
FIG. 2 is a cross-sectional view of the carbonation tank of the invention taken on line 2—2 of FIG. 1.
Figure 4:
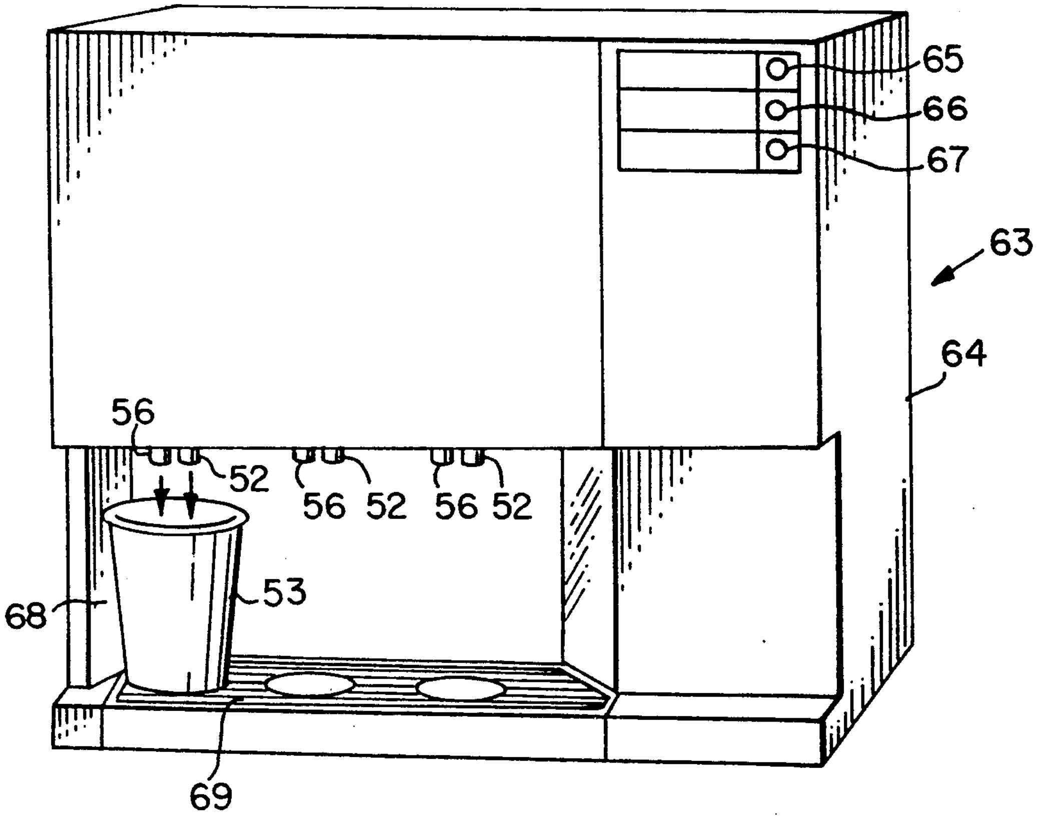
FIG. 4 is a perspective view of one type of cabinet of a post-mix beverage dispenser in which the apparatus of the invention may be used.

The apparatus previously described and shown in FIGS. 1 through 3 may be used in the post-mix beverage dispenser shown in FIG. 4 wherein the dispenser is indicated generally by the numeral 63 which is enclosed in a cabinet 64 having a plurality of flavor selector/start buttons 65, 66 and 67 similar to the start button 59 in FIG. 1. The cabinet 64 also has a cup recess 68 which contains a drip tray 69 at the bottom thereof. As shown in FIG. 4, a cup is placed at one of a choice of three locations beneath pairs of outlets 52 and 56 depending upon which flavor is desired Each of the outlets 52 provides carbonated water and each outlet 56 provides a different flavor concentrate which mixes with the carbonated water in the drinking receptacle 53 placed in recess 68 when the appropriate flavor selector button is pressed.

While in the present preferred embodiment shown herein, a drink counter is used to monitor the water level in the carbonation tank 11, it will be understood that other means of sensing the water level such as a low water sensor located in the tank 11 can also be used to activate the control circuit 19 to begin the filling of the tank 11 with water and injecting carbon dioxide therein to replenish the supply of carbonated water in the tank 11.

It will also be recognized that these and various other modifications can me made in the embodiments shown and described herein without departing from the scope of the invention.

I claim:

1. A process for rapidly carbonating water comprising the steps of:

(A) providing a pressure vessel;

(B) venting the interior of the pressure vessel to the atmosphere;

(C) at least partially filling the vessel with water by injecting the water into the vessel through an orifice configuration positioned to create a circular swirling flow of water within the vessel as it is being filled;

(D) injecting carbon dioxide at a first pressure into the water with the pressure vessel and simultaneously restrictively venting the interior of the pressure vessel for a specified period of time to maintain the internal head pressure at a second pressure which is lower than the first pressure, said venting causing the carbon dioxide to flow rapidly through the water while part of said carbon dioxide is being vented out of the pressure vessel thereby accelerating the carbonation process;

(E) sealing the pressure vessel to the atmosphere when the carbonation process is completed; and (F) continuing to inject carbon dioxide into the pressure vessel at the first pressure to maintain a pressure within the sealed pressure vessel which is sufficient to dispense carbonated water, upon demand, from a liquid outlet in the wall of the pressure vessel.

2. The process as claimed in claim 1 wherein the carbon dioxide is injected into the pressure vessel in a diverging stream beneath the water.

3. The process as claimed in claim 1 wherein the first pressure is in the range of 60 psi (4.22 kg/cm$^2$) to 100 psi (7.03 kg/cm$^2$) and the pressure of the restrictively vented carbon dioxide is in the range of 40 psi (2.81 kg/cm$^2$) to 80 psi (5.63 kg/cm$^2$).

4. The process as claimed in claim 1 wherein the carbon dioxide is injected into the water at the first pressure and simultaneously vented for a period in the range of 0.25 to 0.45 seconds per fluid ounce (8.5 to 15.2 seconds per liter) of water to be carbonated.

5. The process as claimed in claim 1 wherein the pressure vessel is filled to at least 85% of its internal volume.

6. The process as claimed in claim 1 including the step of directing the flow of carbon dioxide into the pressure vessel in such a direction that it causes the water to swirl within the interior of the vessel.

7. The process as claimed in claim 1 including the steps of providing an ice bank on the interior wall of the pressure vessel and causing the water entering the vessel to swirl against the ice bank thereby causing rapid cooling of the water.

8. The process as claimed in claim 1 including the steps of providing refrigeration means to cause ice to form on the interior wall of the pressure vessel and providing a sensor means to detect the thickness of the ice and turn off the refrigeration means when the ice reaches the desired thickness.

9. An apparatus for rapidly carbonating water comprising:

(A) a pressure vessel;

(B) a water supply means connected to the pressure vessel for providing a quantity of water on demand to substantially fill the pressure vessel;

(C) a carbon dioxide supply source;

(D) gas supply line means connecting the carbon dioxide supply source and the pressure vessel to permit the flow of carbon dioxide from the carbon dioxide supply source to the pressure vessel;

(E) means to selectively turn on and off the flow of carbon dioxide through the gas supply means to the pressure vessel;

(F) pressure control mean operatively associated with the gas supply line means to control the pressure of carbon dioxide flowing therethrough to the pressure vessel;

(G) a three way valve in communication with the interior of the pressure vessel to selectively release all or partial amounts of tank head pressure from within the pressure vessel when the valve means is open and to retain the full tank head pressure injected into the pressure vessel from the gas supply line means when the valve means is closed;

(H) a liquid dispensing outlet line in communication with the interior of the pressure vessel to deliver carbonated water when required by the beverage dispenser; and (I) valve means associated with the outlet line to turn on and off the flow of carbonated water through the line.

10. The apparatus claimed in claim 9 wherein the outlet end of the gas supply line means extends into the lower portion of the pressure vessel to provide a gas dispensing outlet beneath the surface of the water when the pressure vessel has been at least partially filled with water.

11. The apparatus claimed in claim 10 wherein the outlet end of the gas supply line means contains a nozzle of a configuration which delivers a divergent spray of carbon dioxide beneath the surface of the water in the pressure vessel.

12. The apparatus claimed in claim 11 wherein the nozzle is positioned to direct the spray of carbon dioxide in such manner as to cause the water to swirl around inside the pressure vessel.

13. The apparatus claimed in claim 11 wherein multiple nozzles are used to provide a more rapid carbonation time.

14. The apparatus claimed in claim 9 wherein the pressure control means is adapted to deliver carbon dioxide to the pressure vessel at a constant pressure both during carbonation of the water and for water dispensing pressure after carbonation of the water is completed.

15. The apparatus claimed in claim 14 wherein the constant pressure of the carbon dioxide delivered to the pressure vessel is in the range of 60 psi (4.22 kg/cm$^2$) to 100 psi (7.03 kg/cm$^2$) and the pressure of the carbon dioxide released from the pressure vessel during carbonation of the water is in the range of 40 psi (2.81 kg/cm$^2$) to 80 psi (5.63 kg/cm$^2$).

16. The apparatus claimed in claim 9 including a pressure relief valve, in communication with the interior of the pressure vessel, which opens when the head pressure within the pressure vessel exceeds a certain pressure.

17. The apparatus claimed in claim 9 wherein the pressure at which the pressure relief valve opens is in a range of 100 psi (7.03 kg/cm$^2$) to 150 psi (10.55 kg/cm$^2$).

18. The apparatus claimed in claim 9 wherein the water supply means includes a water supply tube extending into the pressure vessel and wherein at least a portion of the supply tube has a plurality of spaced apart orifices along its length thereof.

19. The apparatus claimed in claim 9 including refrigeration means to cause ice to form on the interior wall of the pressure vessel and a sensor means to detect the thickness of the ice and turn off the refrigeration means when the ice reaches the desired thickness.

20. The apparatus claimed in claim 9 including a fluid restrictor in the liquid dispensing outlet line to limit the rate of pressure drop and thereby prevent dissolved carbon dioxide from coming out of solution in the water when it is dispensed.

21. The apparatus claimed in claim 9 used in a post mix beverage dispenser wherein the outlet end of the liquid dispensing outlet line is positioned adjacent to the outlet of a syrup dispenser in such a location on the beverage dispenser to provide both carbonated water and syrup upon demand to a drinking receptacle 22. The apparatus claimed in claim 21 including an electronic control circuit which opens a valve in the liquid dispensing outlet line and a valve in the outlet of the syrup dispenser when a start switch is operated.

23. A process for rapidly carbonating water comprising the steps of:

(A) providing a pressure vessel;
(B) venting the interior of the pressure vessel to the atmosphere;
(C) at least partially filling the vessel with water;
(D) injecting carbon dioxide at a first pressure into the water within the pressure vessel in a flow pattern which will cause swirling of the water as the carbon dioxide flows therethrough and simultaneously restrictively venting from the headspace of the pressure vessel, for a specified period of time, a portion of the injected carbon dioxide which has already passed through the water, to cause the carbon dioxide being injected into the water to flow more rapidly through the swirling water and thereby increase the rate of carbonation of the water while maintaining the internal tank head pressure at a specified second pressure which is lower than the first pressure but which is sufficient to aid in retaining the carbon dioxide in solution in the water, thereby further reducing the time required to carbonate the water;
(E) sealing the pressure vessel to the atmosphere when the carbonation process is completed; and
(F) continuing to inject carbon dioxide into the pressure vessel at the first pressure to maintain a pressure within the sealed pressure vessel which is sufficient to dispense carbonated water, upon demand, from a liquid outlet in the wall of the pressure vessel.

24. An apparatus for rapidly carbonating water comprising:

(A) a pressure vessel;
(B) a water supply means connected to the pressure vessel for providing a quantity of water on demand to substantially fill the pressure vessel;
(C) a carbon dioxide supply source;
(D) gas supply line means connecting the carbon dioxide supply source and the pressure vessel to permit the flow of carbon dioxide from the carbon dioxide supply source to the pressure vessel, said gas supply line means including a gas supply tube extending into the pressure vessel and having a gas outlet orifice configuration which provides a directional flow of incoming carbon dioxide that will cause the water to swirl within the vessel while the vessel is being filled;
(E) means to selectively turn on and off the flow of carbon dioxide through the gas supply means to the pressure vessel;
(F) pressure control means operatively associated with the gas supply line means to control the pressure of carbon dioxide flowing therethrough to the pressure vessel;
(G) vent means in communication with the interior of the pressure vessel to selectively provide full venting or restrictive venting of partial amounts of the tank head pressure from within the pressure vessel when the vent means is open and to retain the full tank head pressure injected into the pressure vessel from the gas supply line means when the vent means is closed, said restrictive venting being used while injecting carbon dioxide into the pressure vessel during carbonation to increase the rate of carbon dioxide flow through the water and thereby increase the speed of the swirling mixing motion of the water and carbon dioxide within the pressure vessel;
(H) a liquid dispensing outlet line in communication with the interior of the pressure vessel to deliver carbonated water upon demand; and
(I) valve means associated with the outlet line to turn on and off the flow of carbonated water through the line.

* * * * *